(12) United States Patent
Kotecha et al.

(10) Patent No.: US 10,861,046 B2
(45) Date of Patent: Dec. 8, 2020

(54) SYSTEM AND METHOD FOR PROVIDING CONTENT TO USER DEVICES BASED ON PRIOR CONTENT CONSUMPTION

(71) Applicants: Verizon Patent and Licensing Inc., Arlington, VA (US); Cellco Partnership, Arlington, VA (US)

(72) Inventors: Lalit R. Kotecha, San Ramon, CA (US); Sagiv Draznin, Walnut Creek, CA (US); Jude M. Munn, Pittsburg, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 445 days.

(21) Appl. No.: 15/594,407

(22) Filed: May 12, 2017

(65) Prior Publication Data

US 2017/0345055 A1  Nov. 30, 2017

Related U.S. Application Data

(63) Continuation of application No. 14/087,995, filed on Nov. 22, 2013, now abandoned.

(51) Int. Cl.
*G06Q 30/02* (2012.01)
(52) U.S. Cl.
CPC ................ *G06Q 30/0255* (2013.01)
(58) Field of Classification Search
CPC combination set(s) only.
See application file for complete search history.

(56) References Cited

U.S. PATENT DOCUMENTS

| 8,296,393 B2 * | 10/2012 | Alexander ......... G06Q 30/0256 705/14.4 |
| 2003/0158779 A1 | 8/2003 | Kochi |

(Continued)

OTHER PUBLICATIONS

Baudisch et al. Collapse-to-zoom: viewing web pages on small screen devices by interactively removing irrelevant content. Oct. 2004, Proceedings of the 17th annual ACM symposium on user interface software and technology, vol. 6, issue 2, pp. 91-94. (Year: 2004).*

*Primary Examiner* — William A Brandenburg
*Assistant Examiner* — Christopher C Busch

(57) ABSTRACT

A device may broadcast content (e.g., using Multimedia Broadcast Multicast Service (MBMS), evolved MBMS (eMBMS), or Cell Broadcast Service (CBS)); determine that a user device has received the content; determine analytics information regarding the user device; identify, based on the analytics information, personalized content for the user device; and output, to the user device, the personalized content. The user device may receive the broadcasted content; present the broadcasted content; output an indication that the broadcasted content is being presented; receive the personalized content that was generated based on the outputted indication; and present the personalized content in conjunction with the broadcasted content. The user device may further receive content that has been personalized for other user devices, and a network layer of the user device may discard the content personalized for other user devices before an application layer of the user device receives the content personalized for the user device.

20 Claims, 10 Drawing Sheets

(56) References Cited

U.S. PATENT DOCUMENTS

| | | | | |
|---|---|---|---|---|
| 2008/0181225 A1* | 7/2008 | Zampiello | ............ | H04L 12/1859 |
| | | | | 370/390 |
| 2012/0246588 A1* | 9/2012 | Petersen | ................ | G06Q 30/02 |
| | | | | 715/769 |
| 2013/0080242 A1* | 3/2013 | Alhadeff | ............ | G06Q 30/0239 |
| | | | | 705/14.39 |
| 2014/0082360 A1* | 3/2014 | Laitinen | .............. | H04L 63/0428 |
| | | | | 713/168 |
| 2014/0282710 A1* | 9/2014 | Sankaran | ............. | H04N 21/812 |
| | | | | 725/34 |
| 2014/0337127 A1 | 11/2014 | Morel et al. | | |
| 2015/0032366 A1* | 1/2015 | Man | ................ | G08G 1/096741 |
| | | | | 701/412 |

\* cited by examiner

US 10,861,046 B2

SYSTEM AND METHOD FOR PROVIDING CONTENT TO USER DEVICES BASED ON PRIOR CONTENT CONSUMPTION

BACKGROUND

Content providers may broadcast programming content, such as video content, to an audience. Advertising may be used to encourage the audience to purchase products or services. Advertising may be effective when targeted at specific users. For example, an advertisement for a car may be particularly effective for a user who is presently interested in purchasing a car, an advertisement for men's deodorant may be particularly effective for a user who is a male, etc. Because of the nature of broadcasted content, it may be difficult to ascertain characteristics of users who are accessing the content. That is, users may receive broadcasted content without the provider of the content being aware of who is accessing the content.

DETAILED DESCRIPTION OF PREFERRED EMBODIMENTS

The following detailed description refers to the accompanying drawings. The same reference numbers in different drawings may identify the same or similar elements.

Techniques described herein may allow for the delivery of targeted advertisements to user devices that access broadcasted content (e.g., content that is broadcasted using a Multimedia Broadcast Multicast Service ("MBMS") or an evolved MBMS ("eMBMS") technique). The targeted advertisements may be tailored to be particularly relevant to users of the user devices, in that the targeted advertisements may be based on user demographics, user device behavior history (e.g., history of accessing content, such as web content, multimedia content, etc.), or other types of information. Targeted advertisements may be more effective than non-targeted advertisements, because targeted advertisements may be more likely to be relevant to users. For example, an advertisement for a sports drink may be more relevant to a young user than to an elderly user.

When broadcasting content, content providers may desire to provide targeted advertisements. However, present systems do not generally allow content providers to have knowledge of who is accessing broadcasted content in real time, so content providers are not able to generate or identify targeted advertisements that are specifically tailored to users who are accessing broadcasted content. Additionally, present systems do not generally allow different targeted advertisements to be provided to different user devices in conjunction with the same broadcasted content.

As described herein, some implementations may allow for targeted advertisements to be generated or identified for user devices, which are accessing broadcasted content, in real time. Additionally, some implementations may allow different targeted advertisements to be provided to different user devices in conjunction with the same broadcasted content. For example, two different user devices may receive the same broadcasted content, such as a television program, while each receiving different advertising that is presented in conjunction with the broadcasted content (e.g., as commercial breaks, banners/overlays, etc.).

Figure 1:
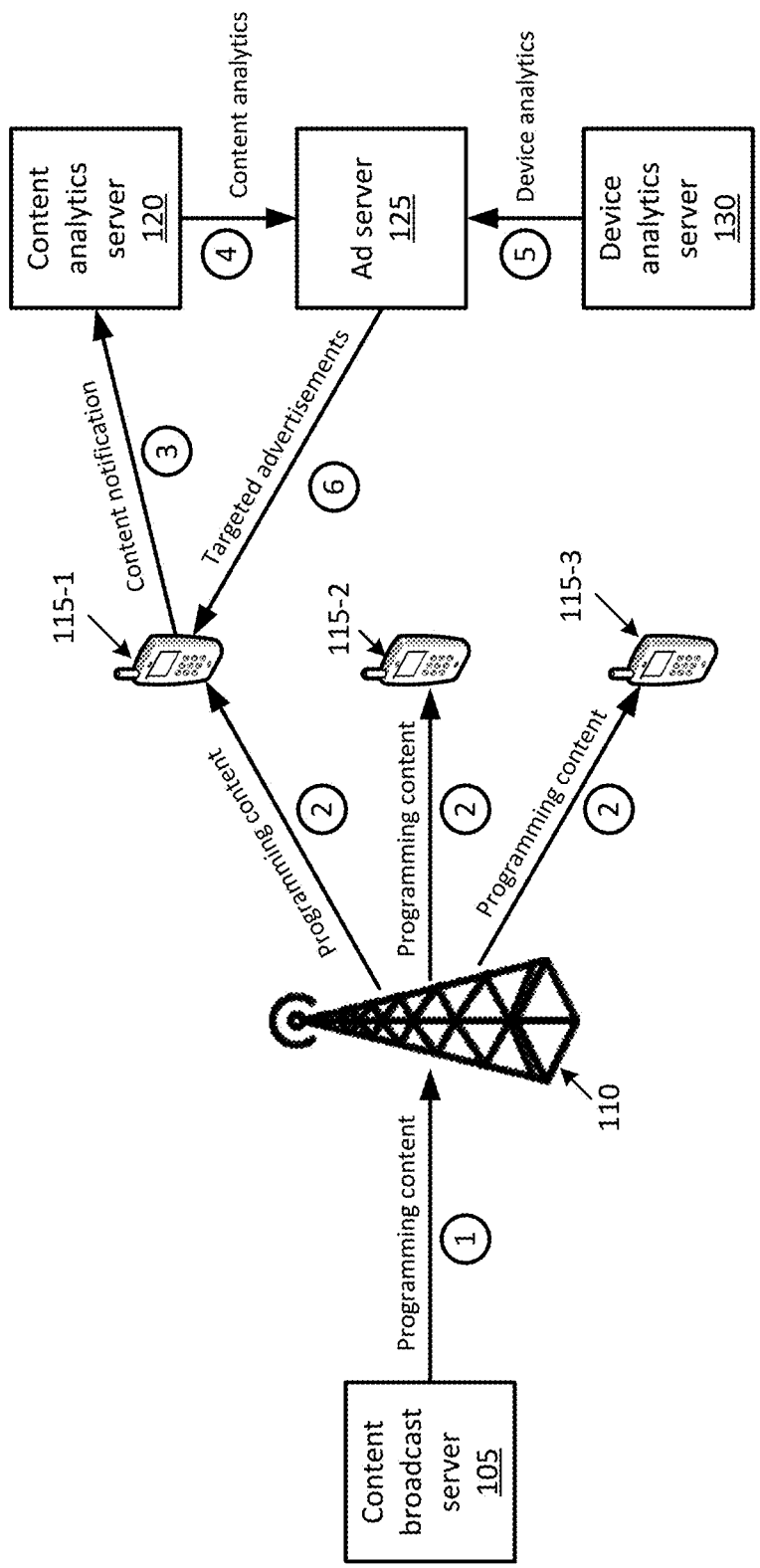
FIG. 1 illustrates an example overview of one or more implementations described herein.

FIG. 1 illustrates an example overview of one or more implementations, in which targeted advertisements may be delivered to user devices. As shown, content broadcast server 105, in conjunction with base station 110, may broadcast programming content towards user devices 115-1 through 115-3. For example, content broadcast server 105 may output (at the arrow marked "1") the programming content to base station 110, which may be a base station of a cellular telecommunications network. Base station 110 may broadcast (at the arrows marked "2") the programming content to user devices 115-1 through 115-3.

The following acts may be performed by user devices 115-2 and/or 115-3, but are described in the context of user device 115-1, for the purpose of brevity. User device 115-1 may present the programming content, such as, for example, displaying a video portion of the programming content via a screen and/or playing an audio portion of the programming content via a speaker or headset. As shown, user device 115-1 may output (at the arrow marked "3") a content notification to content analytics server 120. The content notification may include information identifying user device 115-1, as well as information identifying the programming content being accessed by user device 115-1. Content analytics server 120 may identify analytics information associated with the content, such as a category or genre of the programming content, a length of the programming content, a type (e.g., video and/or audio) of the programming content, one or more keywords associated with the content, etc.

Content analytics server 120 may output (at the arrow marked "4") the content analytics information and/or the content notification to ad server 125. Ad server 125 may also receive (at the arrow marked "5") device analytics information from device analytics server 130. The device analytics information may include information regarding user device 115-1 and/or a user of user device 115-1, such as an age and/or gender of the user, an occupation of the user, web or programming content access history associated with the user and/or user device 115-1, a geographical location of user device 115-1, etc. Such information may be collected from the user, and/or with the user's consent (e.g., pursuant to a user "opting in" to a service whereby user information and/or device history information is collected). In some implementations, a user may have the opportunity to view any or all information collected regarding the user or user devices associated with the user, and may have the opportunity to permanently remove any or all such information.

Ad server 125 may generate or identify targeted advertisements based on the information received from content analytics server 120 and/or device analytics server 130. For example, ad server 125 may identify advertisements that are associated with a type of the programming content being presented by user device 115-1 (e.g., video advertisements when video content is being presented by user device 115-1). As another example, ad server 125 may identify advertisements that are associated with a demographic of a user associated with user device 115-1 (e.g., if the user is a young male, ad server 125 may identify advertisements that would be relevant to young males). As yet another example, ad server 125 may identify advertisements based on a web browsing history associated with user device 115-1 (e.g., if several car manufacturers' web sites have been accessed by user device 115-1 recently, ad server 125 may identify advertisements for cars or local car dealerships). In some implementations, ad server 125 may generate or personalize advertisements for user device 115-1. For example, ad server 125 may insert the name of a user, associated with user device 115-1, into an advertisement.

User device 115-1 may present the targeted advertisements in conjunction with the broadcasted content (e.g., during commercial breaks, as banners/overlays, etc.). As mentioned above, while not shown in the figure, similar acts may be performed by and/or on behalf of user devices 115-2 and 115-3. In this sense, while user devices 115-1 through 115-3 may present the same broadcasted programming content, user devices 115-1 through 115-3 may each present different advertisements in conjunction with the broadcasted programming content. The different advertisements may be more effective than a generic, non-targeted advertisement that would be broadcasted to, and presented by, user devices 115-1 through 115-3.

Figure 2A:
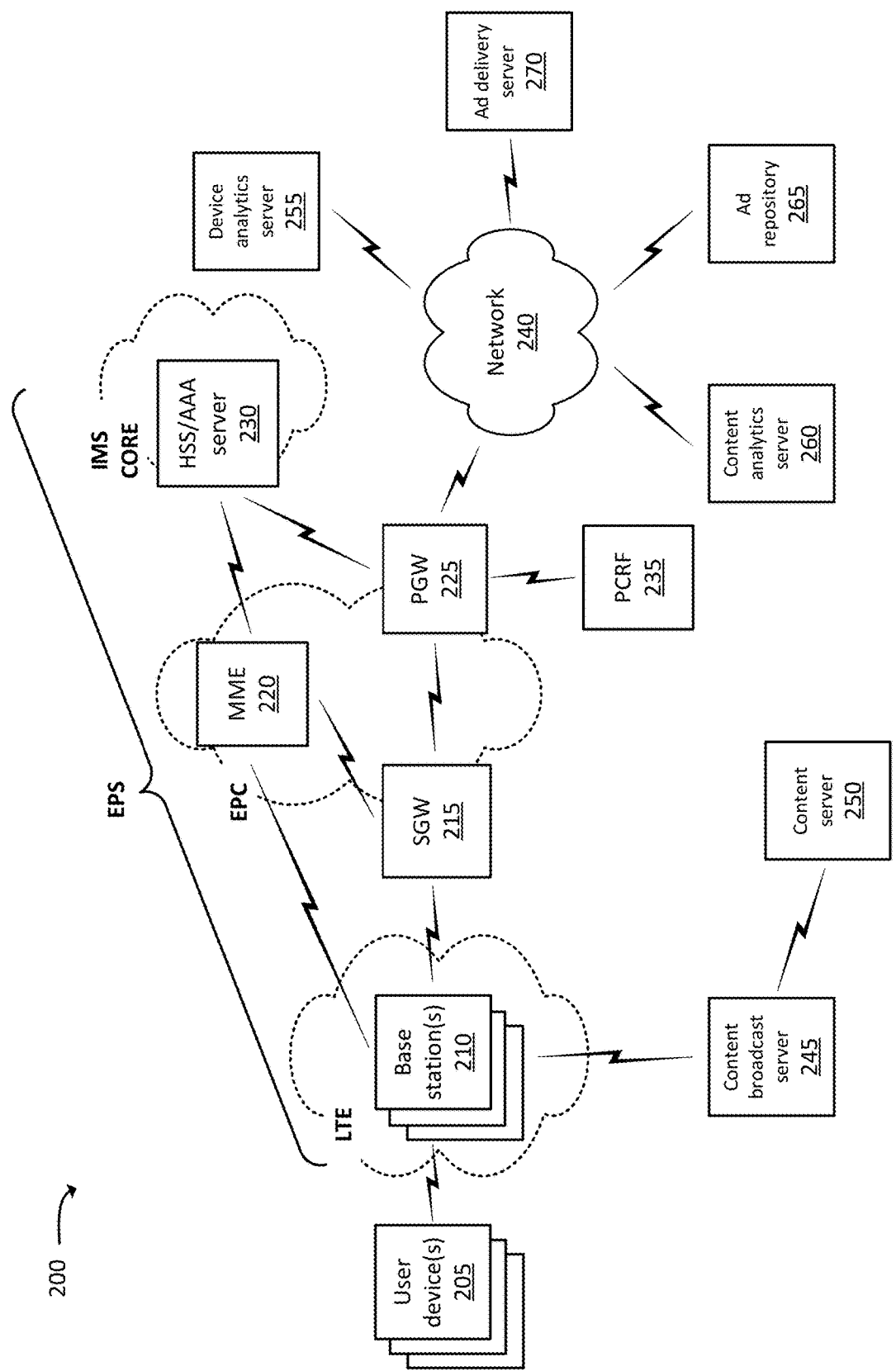
FIGS. 2A and 2B illustrate example environments in which systems and/or methods, described herein, may be implemented.
Figure 2B:
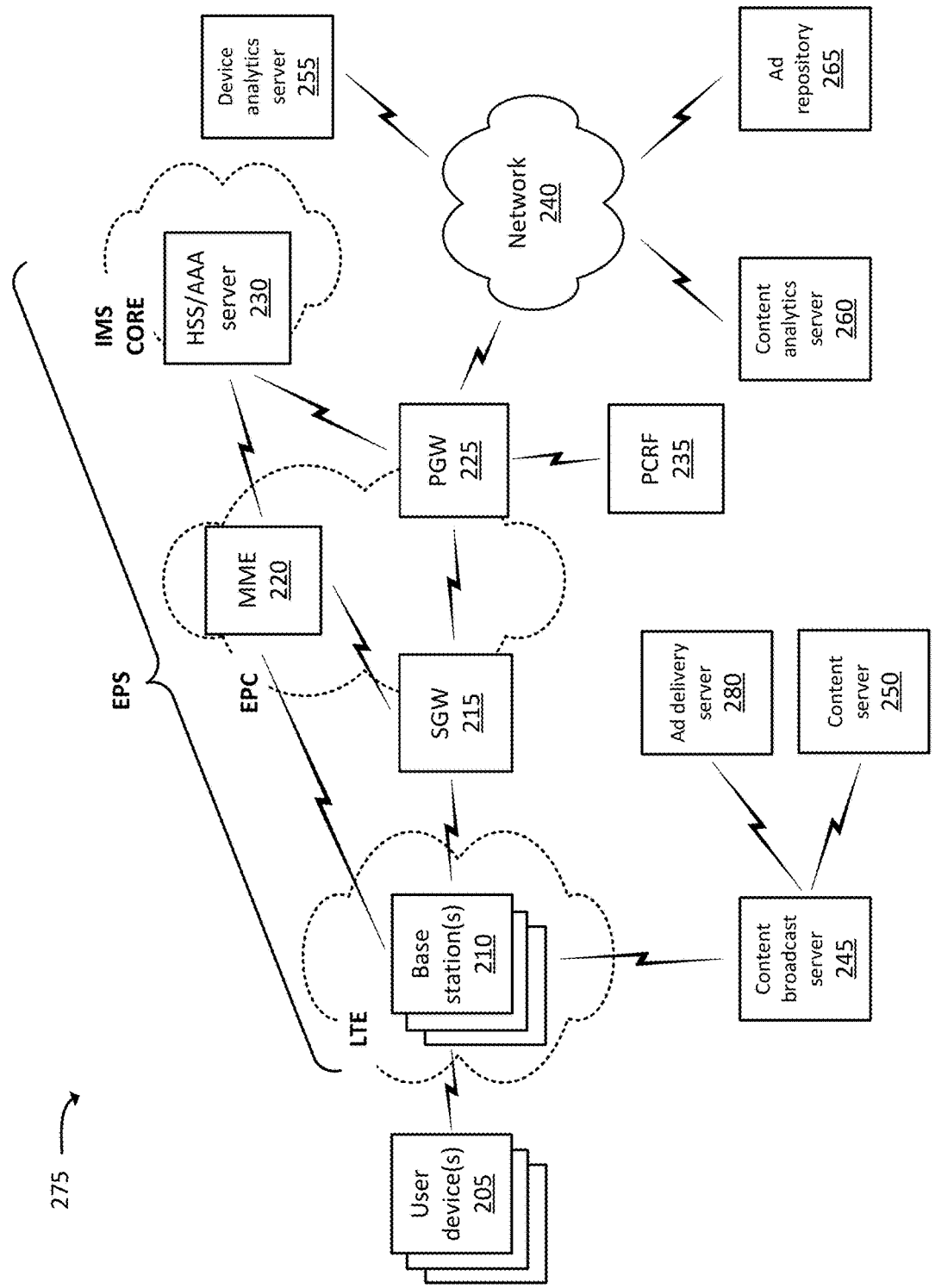

FIGS. 2A and 2B illustrate example environments 200 and 275, respectively, in which systems and/or methods described herein may be implemented. As shown in FIGS. 2A and 2B, environments 200 and 275 may each include one or more user devices 205, one or more base stations 210, serving gateway ("SGW") 215, mobility management entity device ("MME") 220, packet data network ("PDN") gateway ("PGW") 225, home subscriber server ("HSS")/authentication, authorization, accounting ("AAA") server (hereinafter referred to as "HSS/AAA server") 230, policy charging and rules function ("PCRF") 235, network 240, content broadcast server 245, content server 250, device analytics server 255, content analytics server 260, and ad repository 265. Environment 200 may include ad delivery server 270, and environment 275 may include ad delivery server 280. For the sake of brevity, similar elements of FIGS. 2A and 2B are described once below.

The quantity of devices and/or networks, illustrated in FIGS. 2A and 2B, is provided for explanatory purposes only. In practice, there may be additional devices and/or networks; fewer devices and/or networks; different devices and/or networks; or differently arranged devices and/or networks than illustrated in FIGS. 2A and 2B. Alternatively, or additionally, one or more of the devices of environments 200 and/or 275 may perform one or more functions described as being performed by another one or more of the devices of environments 200 and/or 275. Devices of environments 200 and/or 275 may interconnect via wired connections, wireless connections, or a combination of wired and wireless connections.

Environments 200 and 275 may each include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an eNodeB ("eNB"), via which user device 205 may communicate with the EPC network. The EPC network may include one or more SGWs 215, MMEs 220, and/or PGWs 225, and may enable user device 205 to communicate with network 240 and/or an Internet protocol ("IP") multimedia subsystem ("IMS") core network. The IMS core network may include HSS/AAA server 230, and may manage authentication, session initiation, account information, a user profile, etc. associated with user device 205.

User device 205 may include any computation and communication device, such as a wireless mobile communication device that is capable of communicating with one or more networks (e.g., network 240) and/or the IMS core). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, and/or another type of mobile computation and communication device.

Base station 210 may include one or more network devices that receive, process, and/or transmit traffic, such as calls, audio, video, text, television programming content, and/or other data, destined for and/or received from user device 205. In one example, base station 210 may be an eNB device and may be part of the LTE network. Base station 210 may receive traffic from and/or send traffic to network 240 via SGW 215 and PGW 225. Base station 210 may send traffic to and/or receive traffic from user device 205 via an air interface.

SGW 215 may include one or more network devices that gather, process, search, store, and/or provide information. For example, SGW 215 may include a gateway, a router, a modem, a switch, a firewall, a network interface card ("NIC"), a hub, a bridge, a proxy server, or some other type of device that processes and/or transfers traffic. SGW 215 may, for example, aggregate traffic received from one or more base stations 210 and may send the aggregated traffic to network 240 and/or another network via PGW 225. SGW 215 may also aggregate traffic received from network 240 and/or another network (e.g., via PGW 225) and may send the aggregated traffic to user devices 205 via one or more base stations 210.

MME 220 may include one or more computation and communication devices that gather, process, search, store, and/or provide information. For example, MME 220 may perform operations to register user device 205 with the EPS, to establish bearer channels associated with a session with user device 205, to hand off user device 205 from the EPS to another network, to hand off user device 205 from the other network to the EPS, and/or to perform other operations. MME 220 may perform policing operations on traffic destined for and/or received from user device 205.

PGW 225 may include one or more network devices, or other types of computation and communication devices, that gather, process, search, store, and/or provide information in a manner described herein. For example, PGW 225 may include a gateway, a router, a modem, a switch, a firewall, a NIC, a hub, a bridge, a proxy server, an optical add-drop multiplexer ("OADM"), and/or some other type of device that processes and/or transfers traffic. PGW 225 may aggregate traffic received from one or more SGWs 215, and may send the aggregated traffic to network 240. PGW 225 may also, or alternatively, receive traffic from network 240 and may send the traffic toward user device 205 via SGW 215, and/or base station 210.

HSS/AAA server 230 may include one or more server devices, or other types of devices, that gather, process, search, store, and/or provide information. For example, HSS/AAA server 230 may manage, update, and/or store, in a memory associated with HSS/AAA server 230, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 205 and/or one or more other user devices 205. Additionally, or alternatively, HSS/AAA server 230 may perform authentication, authorization, and/or accounting operations associated with the subscriber and/or a communication session with user device 205.

PCRF 235 may include one or more server devices, or other types of devices, that aggregate information to and from the EPC network and/or other sources. PCRF 235 may receive information regarding policies and/or subscriptions from one or more sources, such as subscriber databases and/or from one or more users (such as, for example, an administrator associated with PCRF 235).

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 240 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 240 may be provided by one or more cellular network providers. That is, in some such implementations, network devices within, or associated with, network 240, may be provided by the one or more cellular network providers. In some implementations, network 240 may be communicatively coupled to one or more other networks, such as the Internet.

Content broadcast server 245 may include one or more server devices, which may facilitate in the broadcasting of content to multiple user devices 205. In some implementations, content broadcast server 245 may broadcast programming content, provided by content server 250, via one or more base stations 210. As shown in FIG. 2B, content broadcast server 245 may additionally broadcast advertising content, provided by device analytics server 255. A more detailed example of content broadcast server 245, in accordance with some implementations, is described below with respect to FIG. 3. In some implementations, content broadcast server 245 may implement an MBMS standard, an eMBMS standard, a Cell Broadcast Service ("CBS") standard (e.g., as standardized by the 3GPP), and/or another methodology of broadcasting messages or other content.

In some implementations, content broadcast server 245 may cause multiple different broadcast bearers to be created, each of which may correspond to a particular content stream. For example, one broadcast bearer may correspond to one or more television channels, another broadcast bearer may correspond to one or more other television channels and/or to one or more channels of advertising content. As another example, multiple broadcast bearers may correspond to a single television channel. Each bearer may be associated with a bearer identifier, such as a Temporary Group Mobile Identity ("TMGI"), and/or another identifier.

Content server 250 may provide content, such as programming content, to content broadcast server 245 for broadcast to user device 205. Content server 250 may be associated with a content provider, such as a television company, an on-demand movie company, and/or another distributor of content. The content may be, for example, programming content, such as television content, movie content, music content, and/or other types of content.

Device analytics server 255 may generate and/or store device analytics information regarding user devices 205 and/or users of user devices 205. For example, device analytics server 255 may store behavior history information, such as information regarding content accessed by user device 205 and/or a user of user device 205, preferences or other information provided by a user, demographics information associated with a user (e.g., age, gender, etc.), a geographical location of user device 205, a web browsing history associated with user device 205 and/or a user of user device 205, and/or other types of behavior history information. As mentioned above, behavior history information may be received directly from a user, and/or may be collected based on a user opting in to a service whereby such information is collected and stored on behalf of the user. Device analytics server 255 may generate content analytics information based on information received from user devices 205, HSS/AAA server 230, and/or from another source.

Content analytics server 260 may generate and/or store content analytics information regarding content, provided by content server 250, and accessed by one or more user devices 205. For example, content analytics server 260 may store information regarding genre of content; length of content; actors, actresses, directors, etc. associated with content; or other information regarding content. Content analytics server 260 may receive the information from content server 250 and/or from another source (e.g., a web site that stores information regarding content). Content analytics server 260 may receive content notifications from one or more user devices 205, indicating content that is accessed by user devices 205.

Ad repository 265 may store advertising content, such as, for example, audio, video, and/or image advertisements. Ad repository 265 may store the advertising content with metadata, or "tags," describing the advertising content, and/or a target audience for the advertising content. For example, a video advertisement for a soft drink may be associated with the tags: "video," "soft drink," "soda," and "age group: 9-34." As another example, an advertisement for a regional hardware store in New York City may be associated with the tags: "age group: 24-49," "New York City," and "hardware store." The advertisements and/or the metadata may be provided by, for example, content providers associated with programming content that is broadcasted by content broadcast server 245, and/or from another source.

Ad delivery server 270, shown in FIG. 2A, may generate targeted advertising for a particular user device 205 to be presented in conjunction with broadcasted content that is being accessed by the particular user device 205. For example, as described below, ad delivery server 270 may receive information from device analytics server 255 and content analytics server 260, and may select one or more advertisements, stored by ad delivery server 270, to present to the particular user device 205. Ad delivery server 270 may provide the targeted advertising to the particular user device 205 via a unicast technique (e.g., a "one-to-one" communication technique). In this sense, user device 205 may receive programming content that is broadcasted by content broadcast server 245 to multiple user devices 205, and may also receive targeted advertising that is unicasted by ad delivery server 270.

Ad delivery server 280, shown in FIG. 2B, may also generate targeted advertising for user devices 205 to be presented in conjunction with broadcasted content that is being accessed by devices 205. Ad delivery server 280 may output the targeted advertising to multiple user devices 205 via a broadcast technique, in which targeted advertising for multiple different user devices 205 is received by each particular user device 205. For instance, assume that ad delivery server 280 generates targeted advertising for three user devices 205: "User device A," "User device B," and "User device C." Ad delivery server 280 may select different targeted advertising for each different user device 205 (e.g., "Targeted advertising A," "Targeted advertising B," and "Targeted advertising C"), and may mark each piece of advertising with an identifier associated with its intended recipient. For example, ad delivery server 280 may associate Targeted advertising A with User device A, Targeted advertising B with User device B, and Targeted advertising C with User device C. As described herein, each respective user device 205 may present its associated targeted advertising, while discarding targeted advertising intended for another user device 205.

Figure 3:
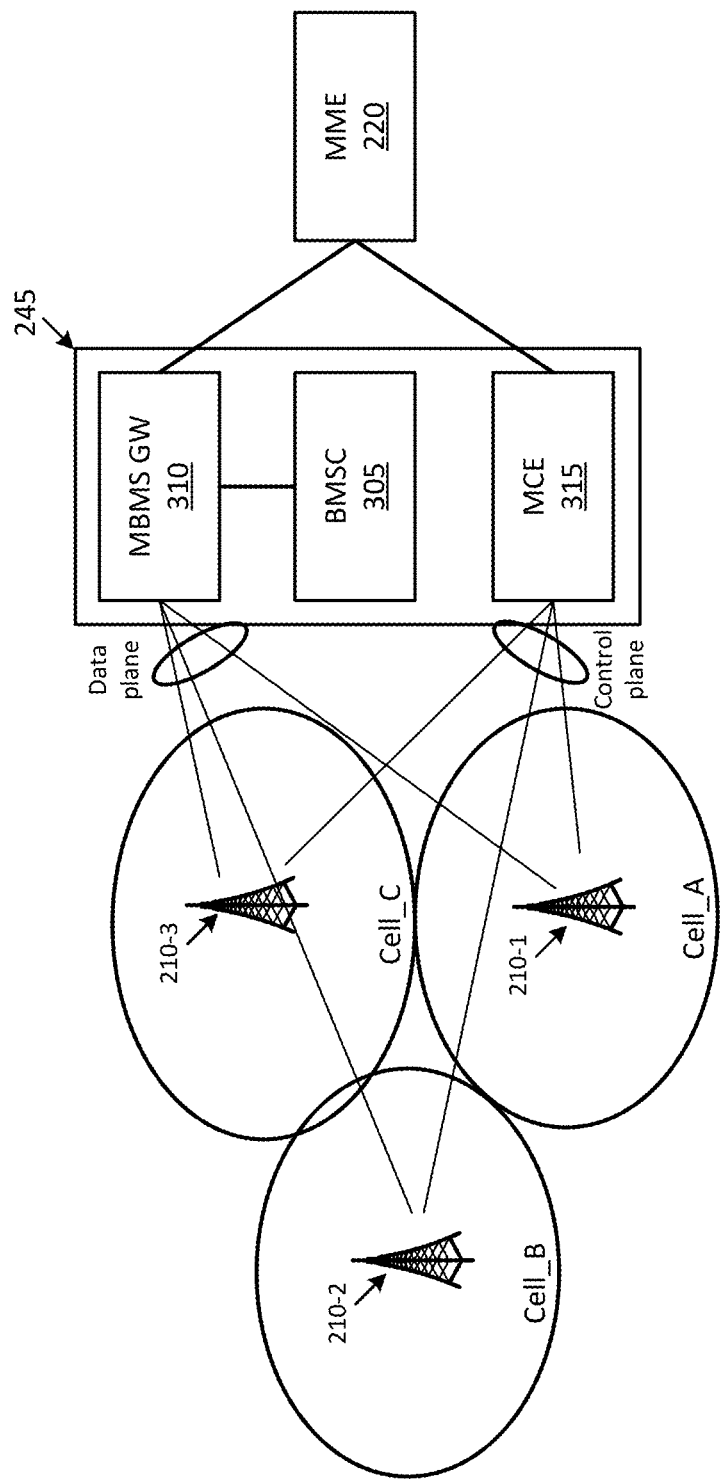
FIG. 3 illustrates an alternate view of some components of an environment in which systems and/or methods, described herein, may be implemented.

FIG. 3 illustrates some components of environments 200 and/or 275 in additional detail. As shown in FIG. 3, content broadcast server 245 may include Broadcast Multicast Service Center ("BMSC") 305, MBMS Gateway ("MBMS GW") 310, and Multi-cell/multicast Coordination Entity ("MCE") 315. In the example shown in FIG. 4, content broadcast server 245 may be in communication with base stations 210-1 through 210-3, each of which may be associated with a respective coverage area, or "cell" (shown in the figure as "Cell_A," "Cell_B," and "Cell_C").

BMSC 305 may include one or more computation or communication devices that provide for the coordination of broadcasting and/or multicasting using MBMS, eMBMS, CBS, and/or another broadcast technique. BMSC 305 may perform functions relating to authorization, charging, and assignment of communication channels. For example, BMSC 305 may assign a particular quantity of broadcast and/or multicast data channels for various content streams. BMSC 305 may also receive content (e.g., programming content from content server 250 and/or targeted advertising from ad delivery server 280, in some implementations) for broadcast transmission, and may forward the received content as part of a broadcast or a multicast transmission.

MBMS GW 310 may include one or more computation and communication devices that provide for the coordination of the sending of broadcast and/or multicast data (e.g., IP multicast packets) to base stations 210. MBMS GW 310 may receive the content, which is to be broadcasted and/or multicasted, from BMSC 305. As illustrated, MBMS GW 310 may transmit MBMS data plane traffic to base stations 210.

As mentioned above, MME 220 may perform policing operations on traffic destined for and/or received from user device 205. MME 220 may, in some implementations, aid in the control signaling necessary for messages to be broadcasted and/or multicasted to user devices 205 associated with base stations 210.

MCE 315 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 315 may transmit MBMS control plane traffic to base stations 210.

In eMBMS, cells associated with base stations 210 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Examples described herein are described in implementations where content is broadcasted to user devices 205. That is, base stations 210 may broadcast content, via broadcast bearers, to user devices 205. In this manner, it is possible that all user devices 205, which are in communication with base stations 210, may receive the content broadcasted from base stations 210. In alternate implementations, one or more base stations 210 may multicast content to multiple user devices 205, without necessarily broadcasting the content to all user devices 205. In multicast implementations, content broadcast server 245 may provide information to base stations 210, indicating which multicast bearers should be associated with which user devices 205.

Figure 4:
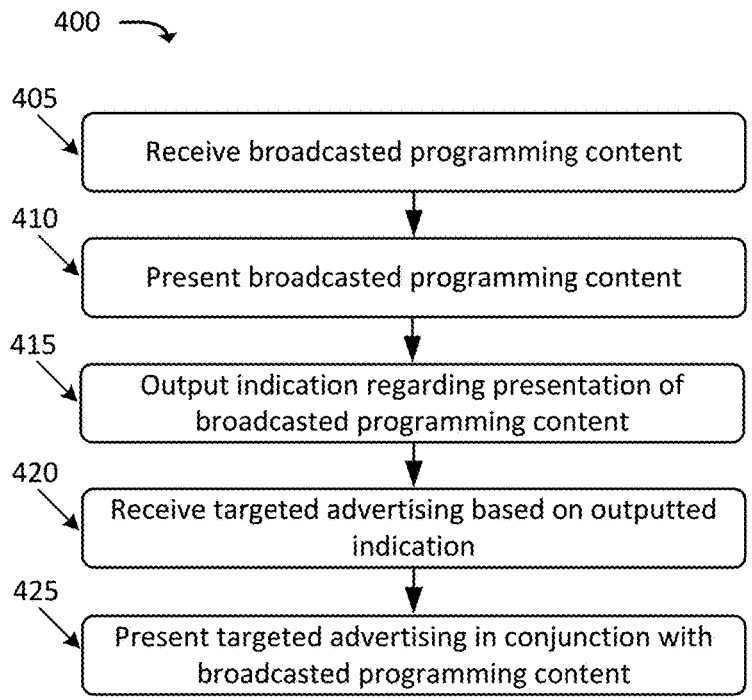
FIG. 4 illustrates an example process for presenting targeted advertising in conjunction with broadcasted content.

FIG. 4 illustrates an example process 400 for presenting targeted advertising in conjunction with broadcasted content. In one example implementation, process 400 may be performed by user device 205. In other implementations, some or all of process 400 may be performed by one or more other devices in lieu of, or in conjunction with, user device 205.

Process 400 may include receiving broadcasted programming content (block 405). For example, user device 205 may receive programming content that has been broadcasted by content broadcast server 245. As mentioned above, the programming content may correspond to programming content provided by content server 250. In some implementations, user device 205 may simultaneously receive multiple different programming content items. For example, user device 205 may receive multiple different television channels and/or movies from content broadcast server 245. The multiple different programming items may be received one or more broadcast bearer channels.

Process 400 may also include presenting the broadcasted programming content (block 410). For example, user device 205 may receive a selection from a user regarding which content the user would like to access. For instance, an application running on user device 205 may be used to present programming associated with a broadcasted television channel that is received at block 405.

Process 400 may further include outputting an indication regarding the presentation of the broadcasted programming content (block 415). For example, user device 205 may output a content indication to content analytics server 260, identifying the content being presented (at block 410). The content indication may also include identifying information for user device 205, such as an International Mobile Equipment Identity ("IMEI") number, an International Mobile Subscriber Identity ("IMSI") number, an IP address, and/or another identifier. In some implementations, the content indication may identify an identity of a user of user device 205. For example, multiple different user profiles may be associated with user device 205, and the content indication may indicate an active user profile when the programming content is accessed.

In some implementations, user device 205 may periodically or intermittently output the content indication while the content is accessed. For example, assume that the presented programming content includes a one-hour long video. User device 205 may output a content indication every minute, every ten minutes, during commercial breaks, when network bandwidth is available, and/or at other times during presentation of the content. In some implementations, user device 205 may output a content indication when new content is presented. For example, assume that a user is viewing one broadcasted channel, and then selects a different broadcasted channel for viewing. In this situation, user device 205 may output a content indication that indicates that the different broadcasted channel is being accessed, and/or that the previous broadcasted channel is no longer being accessed.

Figure 5:
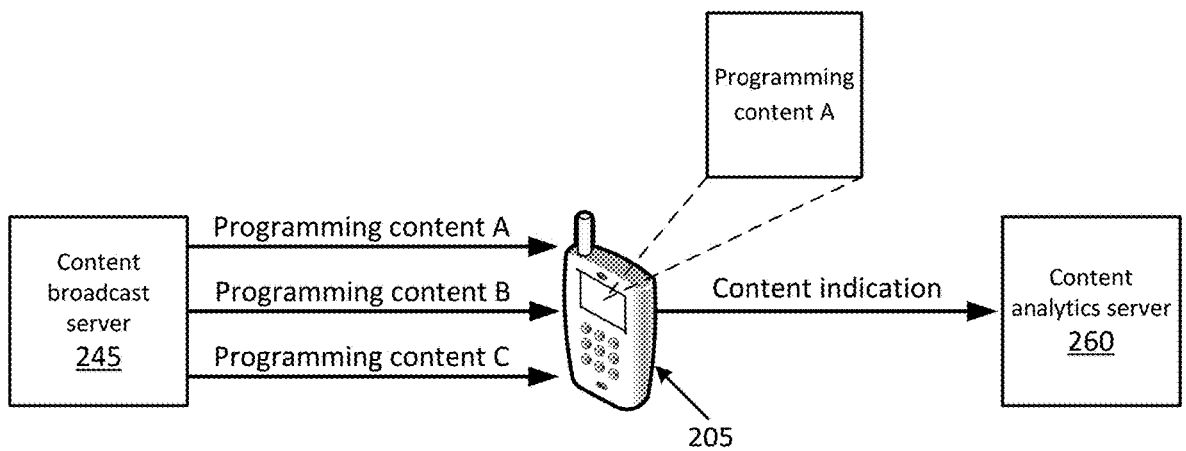
FIG. 5 illustrates an example of outputting a content indication to a content analytics server.

FIG. 5 conceptually illustrates an example of a content indication being outputted based on programming content being presented by user device 205. For example, as shown, user device 205 may receive three different items of broadcasted programming content ("Programming content A," "Programming content B," and "Programming content C") from content broadcast server 245. The different items of programming content may correspond to, for example, three different television channels. As shown, user device 205 may present Programming content A. For example, a user of user device 205 may have selected Programming content A from a menu that presents different options of available programming content. In some implementations, user device 205 may discard Programming content B and Programming content C (e.g., forgo presenting and/or storing Programming content B and Programming content C). As further shown, user device 205 may output a content indication, indicating that Programming content A is being presented, to content analytics server 260.

Returning to FIG. 4, process 400 may additionally include receiving targeted advertising based on the outputted content indication (block 420). For example, as described below, content ad delivery server 270 and/or ad delivery server 280 may generate or identify targeted advertising for user device 205 based on device analytics information and/or content analytics information. User device 205 may receive targeted advertising from ad delivery server 270 and/or ad delivery server 280. For example, as described above, user device 205 may receive unicasted targeted advertising from ad delivery server 260, or broadcasted targeted advertising from ad delivery server 280.

In implementations where user device 205 receives broadcasted targeted advertising from ad delivery server 280, user device 205 may receive broadcasted targeted advertising intended for multiple user devices, and may identify which targeted advertising is intended for user device 205. For example, user device 205 may identify a particular targeted advertisement, in the broadcasted targeted advertisements, that is associated with an IMEI, IMSI, IP address, or another identifier associated with user device 205.

Additionally, or alternatively, the broadcasted targeted advertising may include keywords or other identifiers that describe the targeted advertising. For example, one item of broadcasted targeted advertising may be associated with the keywords, "age: over 65," while another item of broadcasted targeted advertising may be associated with the keywords, "car dealership." User device 205 may store and/or have previously received a set of keywords that may be relevant to a user of user device 205 (e.g., directly from the user and/or another source), and may compare the keywords, associated with the targeted advertising, to the stored keywords to determine whether broadcasted targeted advertising is relevant to user device 205.

Process 400 may also include presenting the targeted advertising in conjunction with the broadcasted programming content (block 425). For example, user device 205 may present the targeted advertising during commercial breaks in the programming content, as banners and/or overlays, or another manner of presentation.

Figure 6:
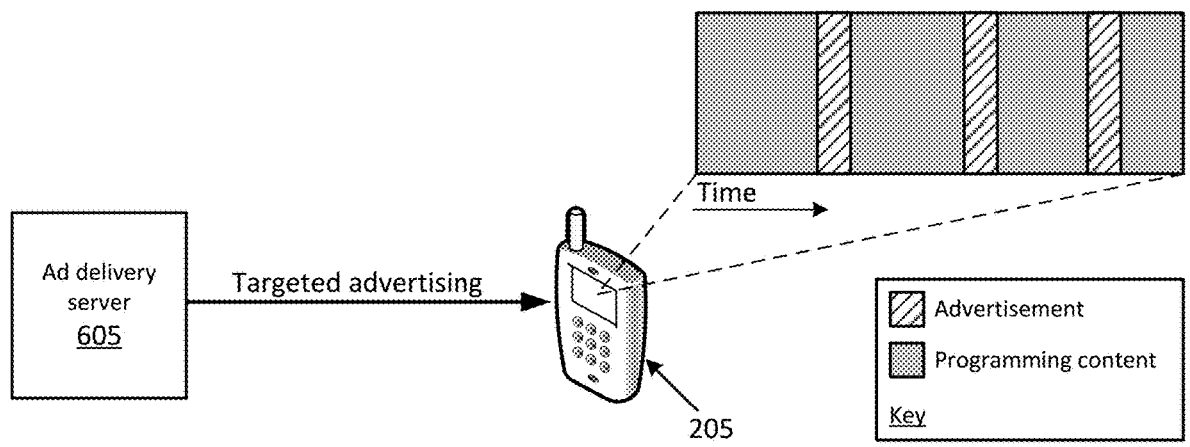
FIG. 6 illustrates an example of presenting targeted advertising in conjunction with broadcasted content.

FIG. 6 illustrates an example of presenting targeted advertising at specified times (e.g., commercial breaks) during the presentation of programming content. As shown, user device 205 may receive targeted advertising from ad delivery server 605 (which may represent ad delivery server 270 or ad delivery server 280). User device 205 may present the targeted advertising during the presentation of the programming content, such as during times indicated by the programming content as commercial breaks.

Figure 7:
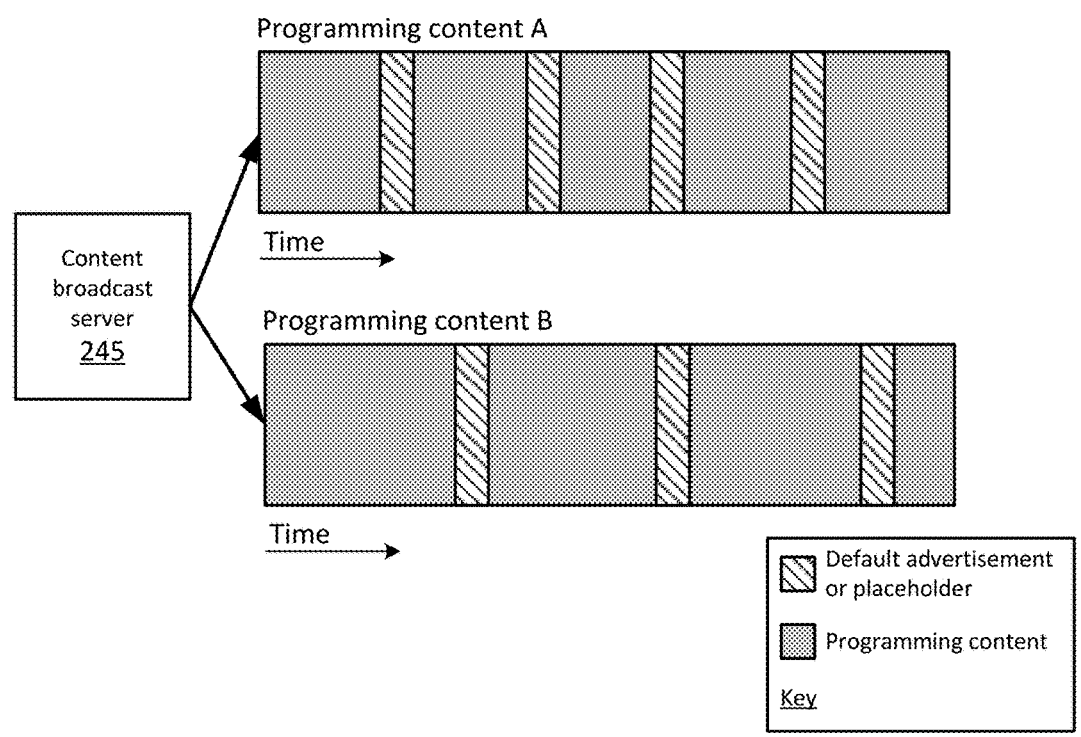
FIG. 7 illustrates an example of different programming content that may be broadcasted by a content broadcast server.

As shown in FIG. 7, the programming content may include periods of time during which a default advertisement or a placeholder (e.g., a placeholder image or video) is shown. In some implementations, during these periods of time, user device 205 may present targeted advertising instead of the default advertisement or placeholder. In the event that user device 205 has not received targeted advertising (e.g., due to a communication or network error), user device 205 may present the default advertisement or the placeholder.

As also shown in FIG. 7, different items of programming content may have differently arranged commercial breaks. For example, as shown, Programming content A may have four commercial breaks, while Programming content B may have three commercial breaks. Additionally, Programming content A and Programming content B may have commercial breaks at different times.

Figure 8:
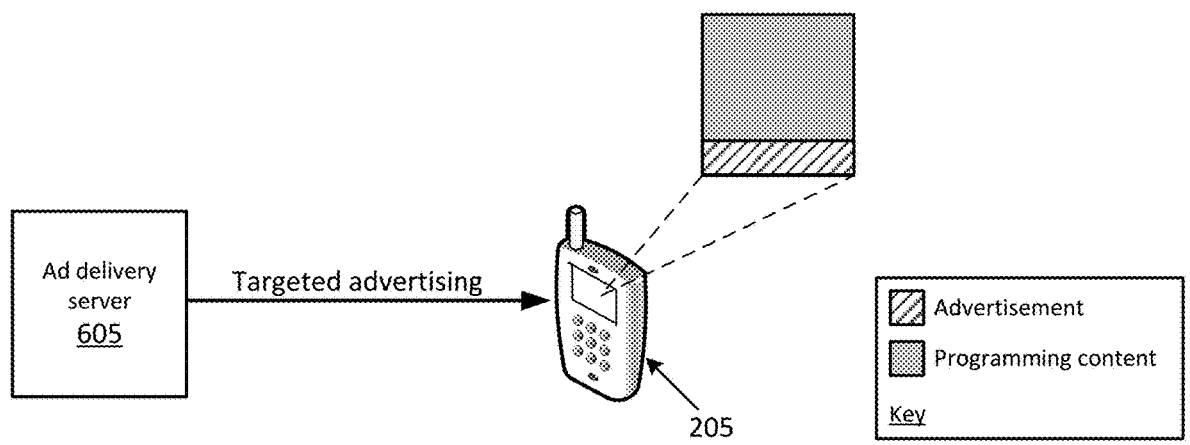
FIG. 8 illustrates another example of presenting targeted advertising in conjunction with broadcasted content.

FIG. 8 illustrates another example presenting targeted advertising. As shown, user device 205 may receive targeted advertising from ad delivery server 605. The targeted advertising may include, for example, an image or a video, and user device 205 may simultaneously present programming content and the targeted advertising. For example, as shown, the targeted advertising may be shown as a banner or an overlay on the programming content. For instance, the programming content may be presented while an advertising image or video is simultaneously presented.

Figure 9:
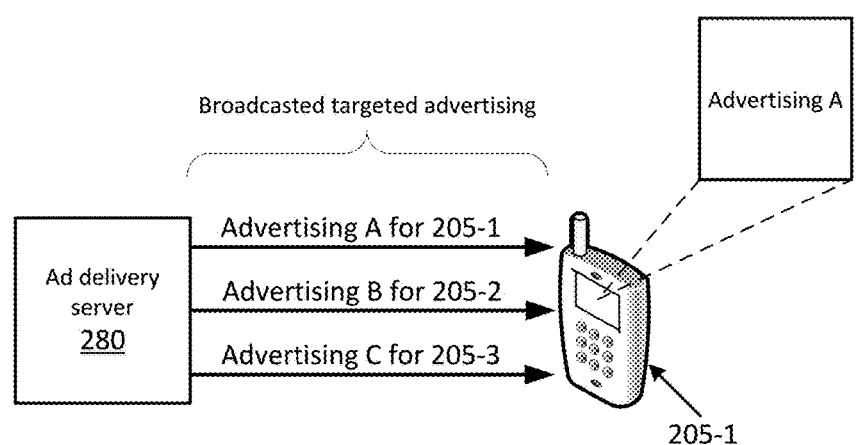
FIGS. 9 and 10 illustrate an example of targeted advertisements being broadcasted to user devices.

FIG. 9 conceptually illustrates an example of a particular user device, user device 205-1, presenting broadcasted targeted advertising. For example, as shown, user device 205-1 may receive broadcasted targeted advertising from ad delivery server 280. The illustrated broadcasted targeted advertising includes Advertising A for user device 205-1, Advertising B for user device 205-2, and Advertising C for user device 205-3. At the network layer (e.g., Layer 3 of the Open Systems Interconnect ("OSI") model), user device 205-1 may receive Advertising A-C. At the network layer, user device 205-1 may identify that Advertising A is intended for user device 205-1, and that Advertising B and Advertising C is not intended for user device 205-1. The network layer of user device 205-1 may provide Advertising A to another layer of user device 205-1 (e.g., an application layer, or Layer 7 of the OSI model), and may discard Advertising B and Advertising C (e.g., may forgo providing Advertising B and Advertising C to the application layer of user device 205-1). User device 205-1 (e.g., an application of user device 205-1) may present Advertising A in a manner described above with respect to, for example, FIG. 6 or FIG. 8.

Figure 10:
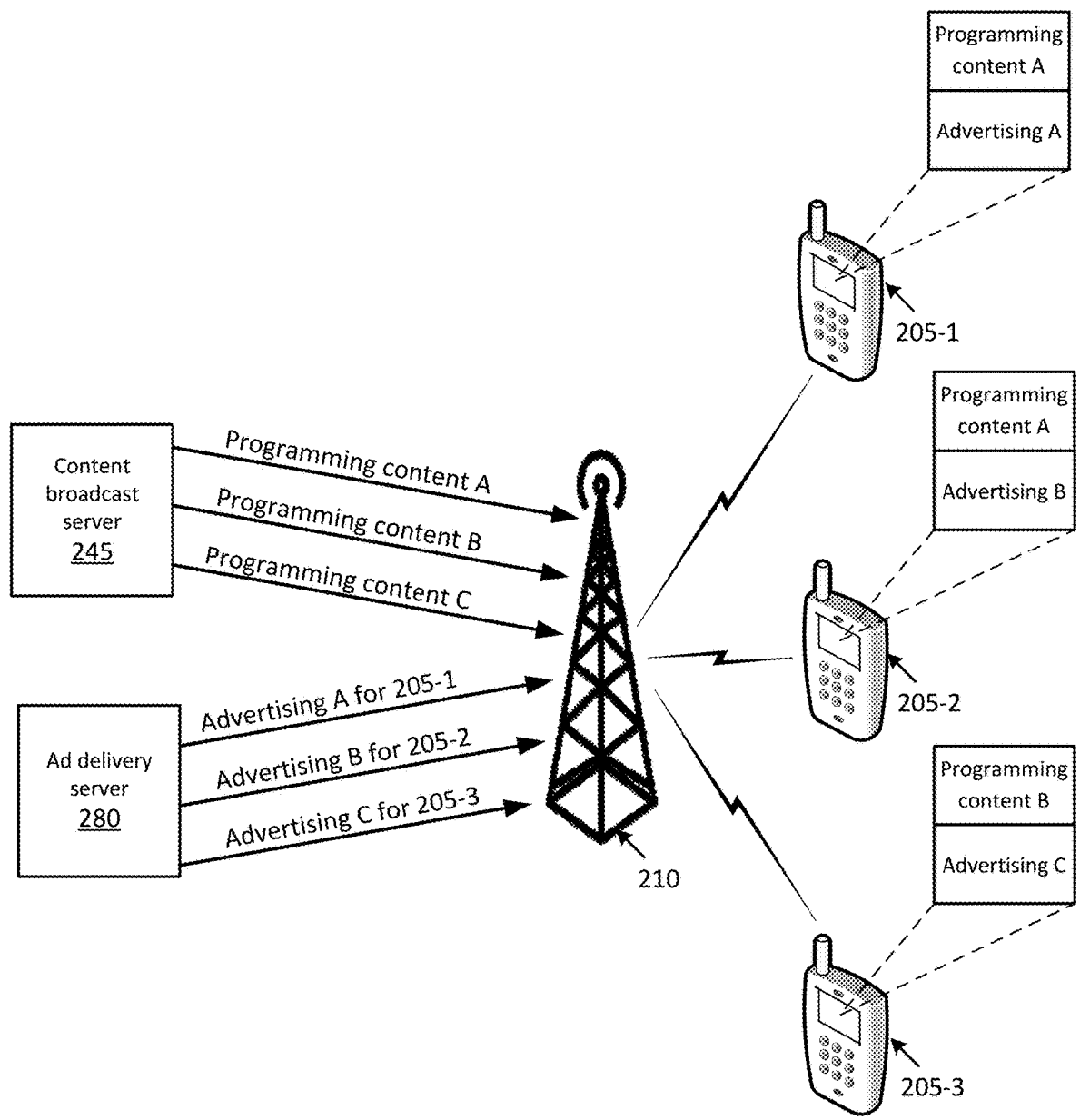

FIG. 10 illustrates an example of different user devices presenting broadcasted targeted advertising in conjunction with broadcasted programming content. For example, content broadcast server 245 may broadcast Programming content A-C, and ad delivery server 280 may broadcast Advertising A-C. Advertising A may be intended for user device 205-1, Advertising B may be intended for user device 205-2, and Advertising C may be intended for user device 205-3. Base station 210 may broadcast the broadcasted programming content and advertising to user devices, such as user devices 205-1, 205-2, and 205-3. As shown, user device 205-1 may present Programming content A in conjunction with Advertising A, user device 205-2 may present Programming content A in conjunction with Advertising B, and user device 205-3 may present Programming content B in conjunction with Advertising C.

Figure 11:
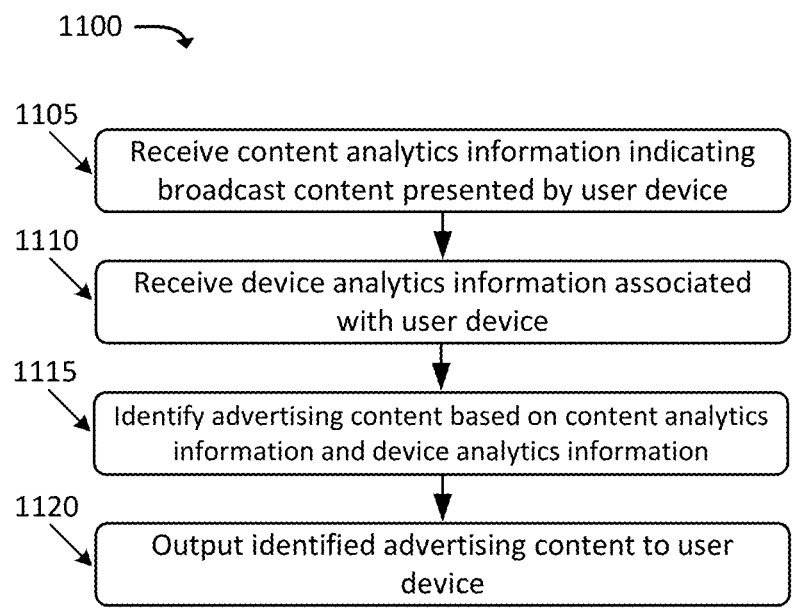
FIG. 11 illustrates an example of outputting targeted advertising to a user device.

FIG. 11 illustrates an example process 1100 for determining and outputting targeted advertising to output to a user device that is presenting broadcasted content. Process 1100 is described below in the context of being performed by ad delivery server 270. In practice, some or all of process 1100 may be performed by ad delivery server 280 and/or another device.

Process 1100 may include receiving content analytics information indicating broadcasted programming content presented by a user device (block 1105). For example, ad delivery server 270 may receive content analytics information from content analytics server 260. As described above, the content analytics information may include information regarding broadcasted content presented by user device 205. The content analytics information may be based on, for example, a content indication provided by user device 205.

Process 1100 may also include receiving device analytics information associated with the user device (block 1110). For example, ad delivery server 270 may receive device analytics information from device analytics server 255. As described above, the device analytics information include information regarding user device 205 and/or a user associated with user device 205.

Process 1100 may further include identifying advertising content based on the content analytics information and the device analytics information (block 1115). For example, as described above, ad delivery server 270 may identify one or more advertisements, stored by ad repository 265, based on the content analytics information and/or the device analytics information. The advertisement or advertisements identified (at block 1115) by ad delivery server 270 may be targeted advertisements, as they may be relevant to a user of user device 205. In some implementations, the advertising content may be determined based solely on device analytics information, solely based on content analytics information, or based on information other than device analytics information or content analytics information.

Process 1100 may additionally include outputting the identified advertising content to the user device (block 1120). For example, ad delivery server 270 may output the identified advertising content to user device 205 via a unicast technique. In some implementations, ad delivery server 280 may output the identified advertising content to user device 205 via a broadcast technique. In some such implementations, ad delivery server 280 may also output advertising content for other user devices 205 using the broadcast technique, as described above.

Figure 12:
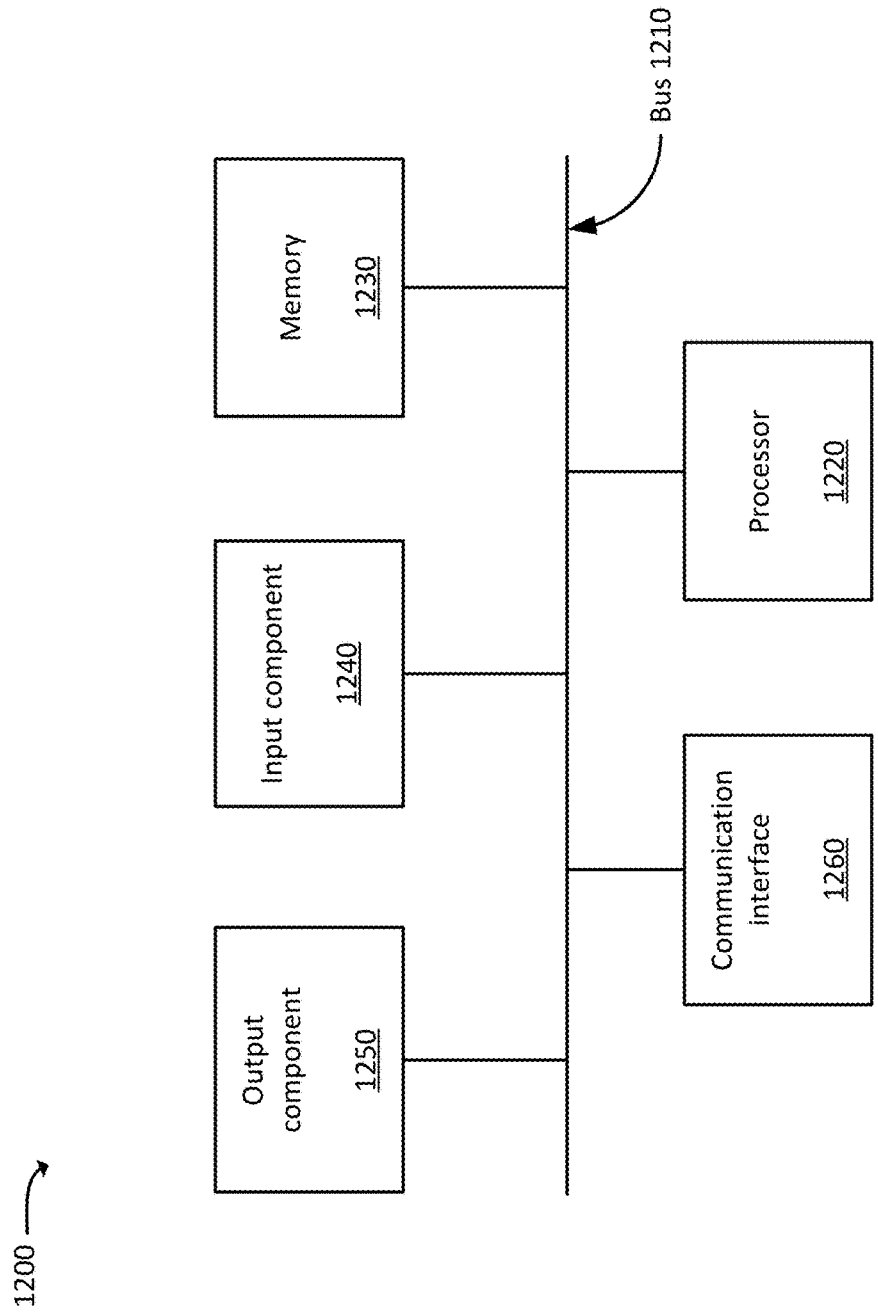
FIG. 12 illustrates example components of one or more devices, according to one or more implementations described herein.

FIG. 12 is a diagram of example components of device 1200. One or more of the devices described above (e.g., as described with respect to FIGS. 1, 2A, 2B, 3, and 5-10) may include one or more devices 1200. Device 1200 may include bus 1210, processor 1210, memory 1220, input component 1230, output component 1240, and communication interface 1260. In another implementation, device 1200 may include additional, fewer, different, or differently arranged components.

Bus 1210 may include one or more communication paths that permit communication among the components of device 1200. Processor 1210 may include a processor, microprocessor, or processing logic that may interpret and execute instructions. Memory 1220 may include any type of dynamic storage device that may store information and instructions for execution by processor 1210, and/or any type of non-volatile storage device that may store information for use by processor 1210.

Input component 1230 may include a mechanism that permits an operator to input information to device 1200, such as a keyboard, a keypad, a button, a switch, etc. Output component 1240 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1210 executing software instructions stored in a computer-readable medium, such as memory 1220. A computer-readable medium may be defined as a non-transitory memory device. A memory device may include space within a single physical memory device or spread across multiple physical memory devices. The software instructions may be read into memory 1220 from another computer-readable medium or from another device. The software instructions stored in memory 1220 may cause processor 1210 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4 and 11, the order of the blocks may be modified in other implementations. Further, non-dependent blocks may be performed in parallel.

Furthermore, the above description was presented in the context of broadcasting programming content. In some implementations, similar techniques may be used for programming content that is multicasted (e.g., delivered to multiple recipients without using a broadcasting technique), or delivered in another fashion. Additionally, while the above description describes examples in which targeted advertising is presented contemporaneously, or interspersed with, programming content; in some implementations, targeted advertising may be presented at different times with respect to programming content. For example, in some implementations, targeted advertising may be presented after the presentation of programming content (e.g., immediately after the presentation of programming content, one minute after the presentation of programming content, one week after the presentation of programming content, etc.).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
broadcasting, by a broadcasting device, programming content;
receiving, by the broadcasting device, an indication that a plurality of user devices have received the broadcasted programming content;
receiving, by the broadcasting device, device analytics information regarding the plurality of user devices;
identifying, by the broadcasting device and based on the device analytics information, a personalized content item for each user device, of the plurality of user devices,
the personalized content items for at least two user devices, of the plurality of user devices, being different personalized content items;
broadcasting, by the broadcasting device, all of the plurality of different personalized content items to the plurality of user devices, wherein broadcasting each respective personalized content item, of the plurality of different personalized content items, includes providing an identifier, associated with the respective user device with which the respective personalized content item is associated, wherein each user device, of the plurality of user devices, receives all of the plurality of different broadcasted personalized content items;
identifying, at a network layer of a particular user device of the plurality of user devices, which particular personalized content item, of the plurality of personalized content items that have been broadcasted by the broadcasting device and have been received by the particular user device, is associated with the particular user device by identifying that the particular personalized content item is associated with the identifier that is associated with the particular user device;
providing, by the network layer of the particular user device to an application layer of the particular user device, the particular identified personalized content item;
presenting, via the application layer of the particular user device, the particular identified personalized content item associated with the particular user device; and
discarding, by the network layer of the particular user device, the other personalized content items, of the plurality of personalized content items broadcasted by the broadcasting device and received by the particular user device, which have not been identified, by the particular user device, as being associated with the identifier that is associated with the particular user device.

2. The method of claim 1, wherein when presenting the particular identified personalized content, associated with the particular user device, the particular user device presents the particular identified personalized content item in conjunction with the broadcasted programming content.

3. The method of claim 1, wherein broadcasting the programming content includes utilizing at least one of:
a Multimedia Broadcast Multicast Service ("MBMS") technique,
an evolved MBMS ("eMBMS") technique, or
a Cell Broadcast Service ("CBS") technique.

4. The method of claim 1, wherein the device analytics information includes behavior history information regarding at least one of:
the particular user device, or
a user associated with the particular user device.

5. The method of claim 4, wherein the behavior history information includes a programming content accessing history associated with the particular user device.

6. The method of claim 1, wherein the device analytics information includes at least one of:
user preferences associated with the particular user device,
demographics information associated with a user of the particular user device, or
a geographical location of the particular user device.

7. The method of claim 1, further comprising:
receiving content analytics information regarding the broadcasted programming content,
wherein identifying the personalized content items for the plurality of user devices is further based on the received content analytics information.

8. The method of claim 1, wherein identifying the personalized content items for the plurality of user devices includes:
identifying one or more keywords associated with the personalized content items; and
comparing the one or more keywords, associated with the personalized content items, with the device analytics information associated with the plurality of user devices,
wherein the personalized content items are identified based on the comparing.

9. A system, comprising:
a plurality of user devices; and
a broadcasting device, the broadcasting device comprising:
a non-transitory memory device storing a set of computer-executable instructions; and
a processor configured to execute the set of computer-executable instructions, wherein executing the set of computer-executable instructions causes the processor to:
broadcast programming content;
identify a received indication that the plurality of user devices have received the broadcasted programming content;
determine device analytics information regarding the plurality of user devices;
identify, based on the device analytics information, a personalized content item for each user device, of the plurality of user devices, the personalized content items for at least two user devices, of the plurality of user devices, being different personalized content items; and
broadcast all of the plurality of different content items, wherein broadcasting each respective personalized content item, of the plurality of different personalized content items, includes providing an identifier, associated with the respective user device with which the respective personalized content item is associated, wherein each particular user device, of the plurality of user devices, receives all of the plurality of different broadcasted personalized content items;
wherein each particular user device, of the plurality of user devices, is configured to:
identify, at a network layer of the particular user device, which particular personalized content item, of the plurality of personalized content items that have been broadcasted by the device and have been received by the particular user device, is associated with the particular user device by identifying that the particular personalized content item is associated with the identifier that is associated with the particular user device;
provide, by the network layer of the particular user device to an application layer of the particular user device, the particular identified personalized content item;
present, via the application layer of the particular user device, the particular identified personalized content item associated with the particular user device; and
discard, by the network layer of the particular user device, the other personalized content items, of the plurality of personalized content items broadcasted by the device and received by the particular user device, which are not associated with the identifier that is associated with the particular user device.

10. The system of claim 9, wherein the particular user device presents the identified personalized content item simultaneously with the broadcasted programming content.

11. The system of claim 9, wherein broadcasting the programming content includes utilizing at least one of:
a Multimedia Broadcast Multicast Service ("MBMS") technique,
an evolved MBMS ("eMBMS") technique, or
a Cell Broadcast Service ("CBS") technique.

12. The system of claim 9, wherein the device analytics information includes behavior history information regarding at least one of:
the particular user device, or
a user associated with the particular user device.

13. The system of claim 12, wherein the behavior history information includes a programming content accessing history associated with the particular user device.

14. The system of claim 9, wherein the device analytics information includes at least one of:
user preferences associated with the particular user device,
demographics information associated with a user of the particular user device, or
a geographical location of the particular user device.

15. The system of claim 9, wherein executing the computer-executable instructions further causes the processor to:
identify received content analytics information regarding the broadcasted programming content, the content analytics information including information regarding at least one of:
a type of the content,
a genre of the content,
a length of the content, or
one or more keywords associated with the content,
wherein identifying the personalized content item for the particular user device is further based on the received content analytics information.

16. The system of claim 9, wherein executing the computer-executable instructions, to identify the personalized content item for the particular user device, further causes the processor to:
identify one or more keywords associated with the personalized content item; and compare the one or more keywords, associated with the personalized content item, with the device analytics information, wherein the personalized content item is identified based on the comparing.

17. A method, comprising:

receiving, from a broadcasting devices and by a plurality of different user devices, broadcasted programming content;

presenting, by the plurality of different user devices, the broadcasted programming content;

outputting, by each of the plurality of different user devices, an indication that the broadcasted programming content is being presented;

receiving, from the broadcasting device and by the plurality of different user devices, a plurality of different broadcasted personalized content items that have been generated and identified by the broadcasting device for the plurality of different user devices;

receiving, from the broadcasting device and by each of the plurality of different user devices, in conjunction with the plurality of different broadcasted personalized content items, a plurality of different identifiers associated with the respective different user devices with which the respective different broadcasted personalized content items are associated;

identifying, by a network layer of a particular user device of the plurality of user devices and based on the plurality of different identifiers, which particular personalized content item, of the received broadcasted personalized content items, is associated with the particular user device, wherein identifying the particular personalized content item includes identifying that the particular personalized content item is associated with the identifier that is associated with the particular user device;

providing, by the network layer of the particular user device, to an application layer of the particular user device, the particular identified personalized content item;

discarding, by the network layer of the particular user device, personalized content items, of the received different broadcasted personalized content items, that are not associated with the identifier that is associated with the particular user device; and presenting, by the application layer of the particular user device, the particular personalized content item, identified as being associated with the particular user device, in conjunction with the broadcasted programming content.

18. The method of claim 17, wherein presenting the personalized content item in conjunction with the broadcasted programming content includes:

presenting the personalized content item in an interspersed manner at designated times during the presentation of the broadcasted programming content.

19. The method of claim 17, wherein receiving the personalized content item includes receiving the personalized content item via a broadcast technique.

20. The method of claim 19, wherein the broadcast technique includes at least one of:

a Multimedia Broadcast Multicast Service ("MBMS") technique, an evolved MBMS ("eMBMS") technique, or a Cell Broadcast Service ("CBS") technique.

* * * * *